US012639435B2

(12) United States Patent     (10) Patent No.:   US 12,639,435 B2

Jourdain     (45) Date of Patent:    May 26, 2026

(54) BUILDING A POTENTIALLY INFECTED FILE LIST DURING DATA PROTECTION USING CHANGE BLOCK LIST

(71) Applicant: Dell Products L.P., Round Rock, TX (US)

(72) Inventor: Gerald M. Jourdain, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 18/594,888

(22) Filed: Mar. 4, 2024

(65) Prior Publication Data

US 2025/0278487 A1     Sep. 4, 2025

(51) Int. Cl.
    *G06F 11/14*     (2026.01)
    *G06F 11/1446*     (2026.01)
    *G06F 21/56*     (2013.01)

(52) U.S. Cl.
    CPC ........ *G06F 21/565* (2013.01); *G06F 11/1451* (2013.01); *G06F 2201/84* (2013.01); *G06F 2221/034* (2013.01)

(58) Field of Classification Search
    CPC .............. G06F 21/565; G06F 11/1451; G06F 2201/84; G06F 2221/034
    USPC .................................................... 726/22–25
    See application file for complete search history.

(56) References Cited

U.S. PATENT DOCUMENTS

| | | | | |
|---|---|---|---|---|
| 7,085,962 | B1* | 8/2006 | Hamilton | G06F 11/1458 |
| | | | | 714/E11.121 |
| 8,495,037 | B1 | 7/2013 | Westenberg | |
| 8,943,595 | B2* | 1/2015 | Piccinini | G06F 21/564 |
| | | | | 726/22 |
| 11,663,332 | B2* | 5/2023 | Kumar | G06F 11/1464 |
| | | | | 726/24 |
| 12,229,020 | B2* | 2/2025 | Fujii | G06F 11/1451 |
| 2012/0233172 | A1* | 9/2012 | Skillcorn | G06F 11/1448 |
| | | | | 707/E17.089 |
| 2019/0220597 | A1 | 7/2019 | Charters et al. | |
| 2020/0319979 | A1* | 10/2020 | Kulaga | G06F 11/1451 |
| 2021/0303405 | A1* | 9/2021 | Slater | G06F 11/1451 |
| 2021/0349748 | A1 | 11/2021 | Dunfey et al. | |
| 2022/0382640 | A1 | 12/2022 | Gunda et al. | |
| 2024/0028725 | A1* | 1/2024 | Segal | G06F 21/566 |
| 2024/0193049 | A1 | 6/2024 | Weissman et al. | |

\* cited by examiner

*Primary Examiner* — Bharat Barot
(74) *Attorney, Agent, or Firm* — Workman Nydegger

(57)        ABSTRACT

One example method includes creating, or accessing, a catalog file list that comprises a list of files and, for each of the files, a respective list of blocks of that file, identifying any of the blocks that have changed since an earlier backup of the file, updating the catalog file list to indicate any of the blocks that have changed, for any file(s) determined to have one or more changed blocks, adding those files to a changed file list, receiving information identifying blocks that are known or suspected to have been compromised, and generating an infected file list by mapping the blocks known or suspected to have been compromised to corresponding files of the changed file list.

20 Claims, 4 Drawing Sheets

COMPUTING INFECTED FILE LIST DURING BACKUP
*USING TARGET ON SOURCE DEVICE*

COMPUTING INFECTED FILE LIST POST BACKUP

*POST PROCESS USING TARGET BACKUP*

BUILDING A POTENTIALLY INFECTED FILE LIST DURING DATA PROTECTION USING CHANGE BLOCK LIST

FIELD OF THE INVENTION

Embodiments of the present invention generally relate to identification of files, and their components, that may be infected in some way. More particularly, at least some embodiments of the invention relate to systems, hardware, software, computer-readable media, and methods, for analyzing change blocks between backups of an asset and using the outcome of the analysis to create a list of possibly infected files.

BACKGROUND

Conventional approaches to data protection may not consider whether or not the data that is being backed up, or has been backed up, has been compromised in some way. As a result, compromised data may be backed up together with legitimate data, and the data owner and/or the backup application may be unaware that the data has been compromised, or that the compromised data has been backed up.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
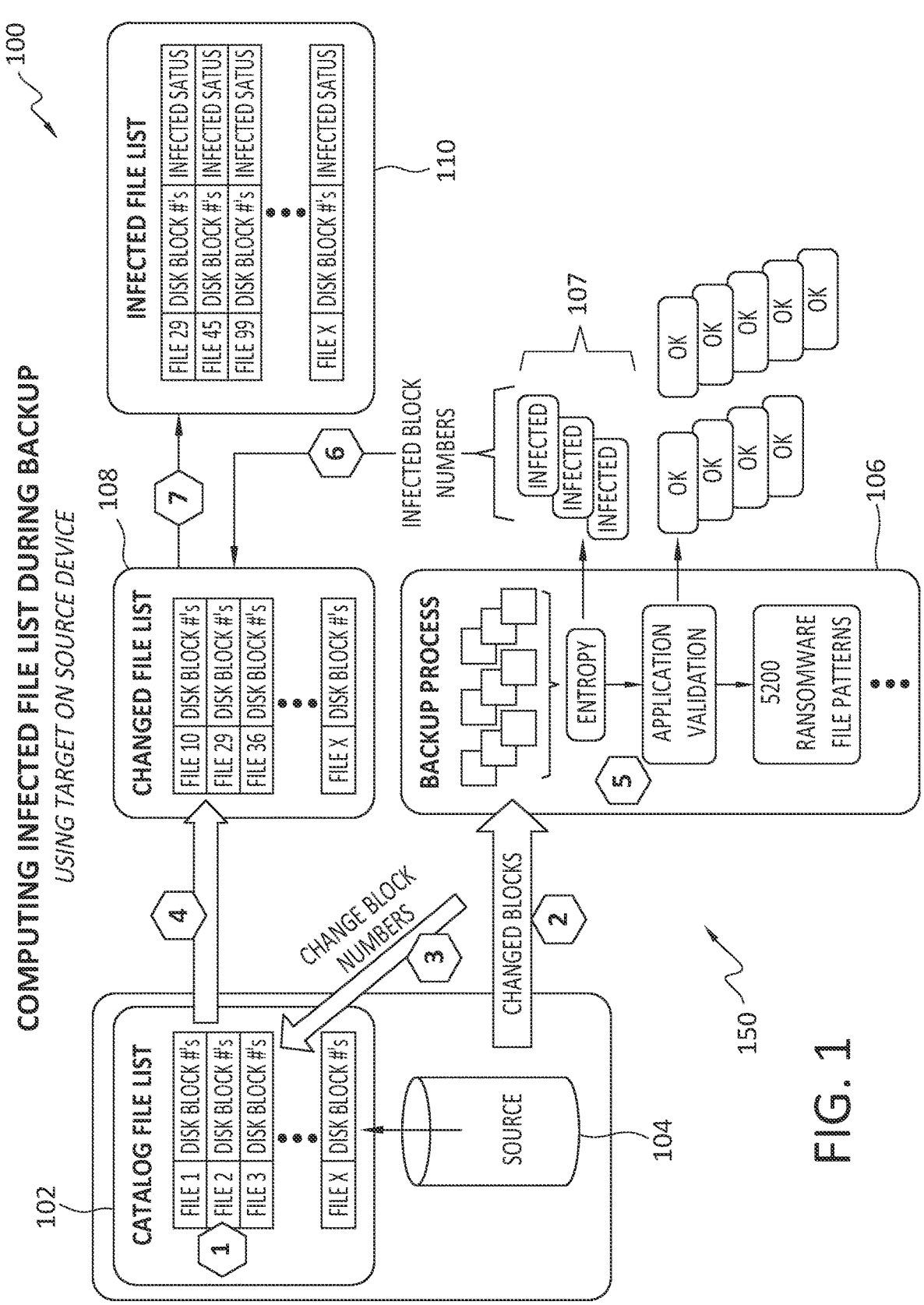
FIG. 1 discloses aspects of a method for generating an infected file list while a backup is being performed, according to an embodiment.

Embodiments of the present invention generally relate to identification of files, and their components, that may be infected in some way. More particularly, at least some embodiments of the invention relate to systems, hardware, software, computer-readable media, and methods, for analyzing change blocks between backups of an asset and using the outcome of the analysis to create a list of possibly infected files.

One embodiment comprises a method that operates to build a potentially infected file list by analyzing the change blocks between two backups of an asset, that is, blocks that have changed between the two backups, and storing that infected file list alongside the backup so as to enable self-description, by the backup, of the changes that have occurred. In more detail, this example method may comprise: building of a catalog file list; feeding the list of change block numbers into the catalog file list; translating, using the catalog file list, the list of change blocks into a list of those files that have changed between two backups; analyzing each change block for potential problems such as infections; passing the list of potentially infected blocks to the list of changed files; and, using the list of potentially infected blocks and the list of changed files, generating an entry, for the infected file list, that identifies a file that may be infected.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that potentially compromised files may be identified, and corresponding remedial action(s) taken. An embodiment may identify detect compromised files inline with an ongoing data protection process being performed with respect to those files. An embodiment may define and create a self-describing backup. An embodiment may eliminate the need for backup post-processing operations to identify possibly infected files. Various other advantages of one or more example embodiments will be apparent from this disclosure.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM).

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, as used herein, the term 'backup' is intended to be broad in scope. As such, example backups in connection with which embodiments of the invention may be employed include, but are not limited to, full backups, partial backups, clones, snapshots, and incremental or differential backups.

B. Overview of Aspects of an Example Embodiment

Data protection is often thought of as being synonymous with backup. Backing up a block device can be expensive and time consuming. Applications often resort to just backing up the blocks that have changed since the last backup. These blocks are referred to as 'changed blocks' and the process by which they are captured is sometimes referred to as change block tracking (CBT).

Backup applications may build a catalog of files and directories, and the catalog may be stored in a disk that is being backed up. This approach and configuration may enable search and retrieval of files on an individual file basis. If, during this catalog building process, the block numbers associated with each file are captured, then the change blocks can be combined with this initial catalog to produce a file change list between backups. That is, because the identity of the changed blocks is known, and because the files that include those changed blocks are identified, a list of files may be generated that have changed since a previous operation, such as a backup.

In an embodiment, generating a list of which files have changed, simply by using a list of changed blocks, may be beneficial. For example, this approach may enable determination of exactly which file content is being, and/or has been, modified. Storing this changed file list alongside the backup itself enables a self-describing nature of the backup. That is, the combination of the backup and the list of files in the backup that have changed, comprises a 'self-describing backup' that identifies not only the files that have been backed up, but also the changes that have occurred, and in which file(s), since the preceding backup.

In addition to building a change file list from the change block list numbers, the change blocks themselves may be interrogated for anomalies. In an embodiment, this interrogation may include tests for encryption, and validation of expected data format. Example interrogations may comprise queries such as: does a particular change block have a high entropy indicating the likelihood of encrypted data?; has the magic number of an application been obfuscated?; and, is the block's data in-line with previous blocks for this same file?.

If, during a change block analysis, a particular block is deemed to be outside defined normal behavior, that block may be classified as "possibly infected" and looked up in the changed file list to identify which file includes that block and is, accordingly, potentially infected. That file may then be added to an infected file list. Upon completion of the backup, if infected files were encountered during the backup, then an infected file list, that is, a list of infected files, and the identifying numbers of the respective 'possibly infected' blocks of those files, may be generated and stored alongside the backup, to create a self-describing backup.

It is noted that as used herein, the term 'asset' refers to the source object that is being backed up or has been backed, such as, but not limited to, a laptop, a VM, NAS (network attached storage) device, or any other system and/or device that has data which may be targeted for protection in some way. In an embodiment, an asset may be backed up using a policy of some kind, either manual or on a scheduled frequency.

C. Detailed Discussion of Aspects of an Example Embodiment

In an embodiment, a list of potentially infected files, or infected file list, may be built based on an analysis of those blocks that have changed between two backups of an asset. That infected file list may then be stored alongside the backup. An embodiment may begin with the building of a catalog file list and feeding the list of change block numbers into the catalog file list for translating into a list of which files have changed between two backups. Once the changed file list has been produced each change block can be analyzed for potential infections and passed to the change file list to produce a potentially infected file entry in the infected file list.

The generation, or computing, of a list of infected files, may be performed at various different times with respect to a backup process. For example, the list of infected files may be generated inline, that is, as the backup is being performed. As another example, the list of infected files may be generated post-process, that is, after the backup has been completed. The following discussion addresses these two examples, although the scope of the invention is not limited to these.

C.1 Computing Infected File List During Backup (Using Target on Source Asset)

With reference now to FIG. 1, an example architecture 100, and associated method 150, according to an embodiment, are disclosed. Part, or all, of the method 150 may be performed while a backup process is ongoing.

In general, the architecture 100 may comprise various elements including, but not limited to, a catalog file list 102 and associated source 104, a backup process 106, changed file list 108, and an infected file list 110. Each of these is addressed below in the discussion of the example method 150, which may comprise operations (1) through (7) disclosed in FIG. 1.

In an embodiment, the method 150 may begin with the construction (1) of the catalog file list 102. The catalog file list 102 may include a list of files, and for each of those files, a list of blocks—identified by a respective number or other unique designator—that corresponds to the file. The catalog file list 102 may be generated based on data, such as the files, stored in the source 104. The source 104 may comprise one or more assets.

In an embodiment, only the blocks that have changed since a prior backup may be backed up in a subsequent backup. Thus, any such changed blocks may be provided (2) to the backup process 106 for backing up. At any time after the changed blocks have been identified, the catalog file list 102 may be updated (3) to include the numbers of those changed blocks, that is, the disk block numbers.

With the disk block numbers of the changed blocks obtained (4) from the catalog file list 102, the changed file list 108 may then be generated. As shown in the example of FIG. 1, the changed file list 108 may comprise a list of files that have one or more changed blocks, as well as a listing of changed blocks, identified by respective disk block numbers, for each of those files. The operations (3) and (4), at least, may be implemented while the backup process 106 is in progress.

As part of the backup process 106, various checks or interrogations may be performed (5) as part of a change block analysis implemented by the backup application, with respect to the changed blocks that are being backed up. Such interrogations may comprise, for example, checking the entropy of the changed blocks, determining whether the 'magic number' of an application to which a block pertains has been obfuscated in some way, and examining the blocks for any evidence of a ransomware attack.

After the interrogations (5) of the individual changed blocks have been performed, the backup application may then designate each of the examined blocks as 'OK' or 'Infected.' The disk block numbers of the 'Infected' blocks 107 may then be provided (6) by the backup application to the changed file list 108. In an embodiment, the backup application may, itself, update the changed file list 108 to include the disk block numbers of the 'Infected' blocks 107.

With the list of changed files at hand, and with the indications as to which blocks of which files are known to be 'Infected,' there is enough information to generate (7) the infected file list 110. That is, and as noted earlier, the changed file list 108 comprises a list of all files that have changed, as determined by the fact that at least one block of each of those files has changed since an earlier backup. However, merely because a block has changed, it is not necessarily the case that the block or the associated file is infected. Thus, the disk block numbers of the 'Infected' blocks 107 may then be used to identify those files whose changed blocks are 'Infected.' Any file without one or more 'Infected' blocks may be deemed as not being 'Infected.' Inasmuch as the disk block numbers of the 'Infected' blocks 107 may enable the identification of those files whose changed blocks are 'Infected,' those disk block numbers implicitly also enable the identification of those files that do not have any 'Infected' blocks.

Consistent with the foregoing, it can be seen in FIG. 1 that not all of the files included in the changed file list 108 are also included in the infected file list 110. For example, files 10 and 29 appear in the changed file list 108, but of those two, only file 29 also appears in the infected file list 110. Thus, while file 10 had one or more changed blocks, none of those blocks were infected. On the other hand, one or more of the changed blocks of file 29 were infected.

C.2 Computing Infected File List Post Backup (Post Process Using Target Backup)

In an embodiment, and in contrast with the approach disclosed in FIG. 1, an infected file list may be generated based on a backup that has already been completed. One example of such an approach is disclosed in FIG. 2. As the approach in FIG. 2 may be similar, or identical, to the approach in FIG. 1, in one or more regards, the following discussion is focused primarily on selected differences between the two approaches.

Figure 2:
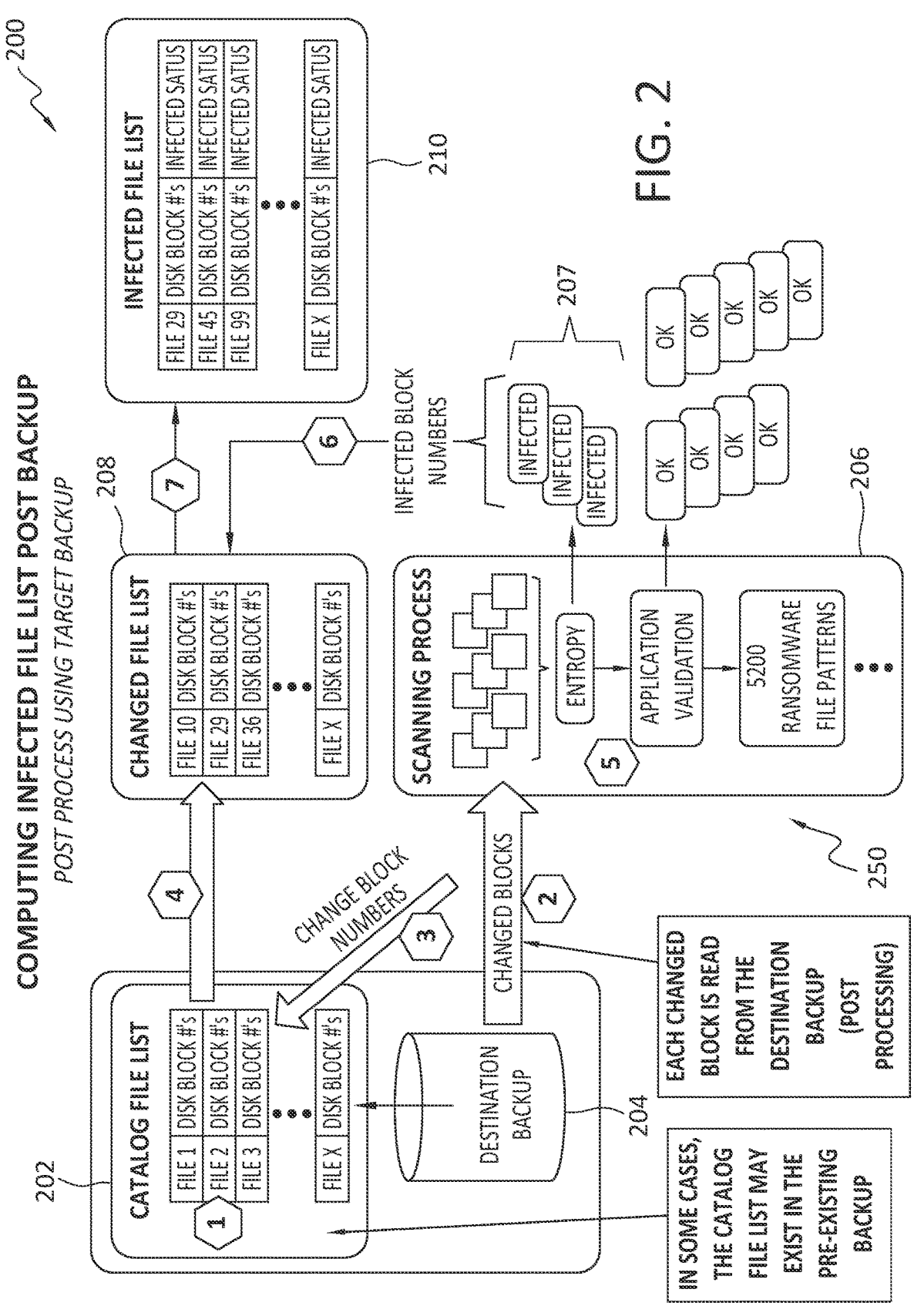
FIG. 2 discloses aspects of a method for generating an infected file list after a backup has been performed, according to an embodiment.

With reference now to FIG. 2, an example architecture 200, and associated method 250, according to an embodiment, are disclosed. Part, or all, of the method 250 may be performed after completion of a backup process that backed up one or more files, and one or more of the files may comprise one or more normal blocks and/or one or more 'Infected' blocks.

In general, the architecture 200 may comprise various elements including, but not limited to, a catalog file list 202 and associated destination backup 204, a scanning process 206, changed file list 208, and an infected file list 210. In an embodiment, the scanning process 206 may be a component of a backup process, such as the example backup process 106. Each of these is addressed below in the discussion of the example method 250, which may comprise operations (1) through (7) disclosed in FIG. 1.

In an embodiment, the method 250 may begin with the construction (1) of the catalog file list 202. The catalog file list 202 may include a list of files, and for each of those files, a list of blocks—identified by a respective number or other unique designator—that corresponds to the file. The catalog file list 202 may be generated based on data, such as the files, stored in the destination backup 204. The destination backup 204 may comprise one or more backups of one or more assets. In an embodiment, the catalog file list 202 may already exist in, or otherwise be associated with, the destination backup 204. Thus, in such an embodiment, (1) may be omitted.

In an embodiment, only the blocks that have changed since a prior backup may be present in the destination backup 204. Thus, any such changed blocks may be provided (2) to the scanning process 206 for evaluation. At any time after the changed blocks have been identified, such as by performing a query of the destination backup 204, the catalog file list 202, whether existing or newly created (1), may be updated (3) to include the numbers of those changed blocks, that is, the disk block numbers.

With the disk block numbers of the changed blocks obtained (4) from the catalog file list 202, the changed file list 208 may then be generated. As shown in the example of FIG. 2, the changed file list 208 may comprise a list of files that have one or more changed blocks, as well as a listing of changed blocks, identified by respective disk block numbers, for each of those files.

As part of the scanning process 206, various checks or interrogations may be performed (5) as part of a change block analysis implemented by the backup application, with respect to the changed blocks that are being backed up. Such interrogations may comprise, for example, checking the entropy of the changed blocks, determining whether the 'magic number' of an application to which a block pertains has been obfuscated in some way, and examining the blocks for any evidence of a ransomware attack.

After the interrogations (5) of the individual changed blocks have been performed, the backup application may then designate each of the examined blocks as 'OK' or 'Infected.' The disk block numbers of the 'Infected' blocks 207 may then be provided (6) by the backup application to the changed file list 208. In an embodiment, the backup application may, itself, update the changed file list 208 to include the disk block numbers of the 'Infected' blocks 207.

With the list of changed files at hand, and with the indications as to which blocks of which files are known to be 'Infected,' there is enough information to generate (7) the infected file list 210. That is, and as noted earlier, the changed file list 208 comprises a list of all files that have changed, as determined by the fact that at least one block of each of those files has changed since an earlier backup. However, merely because a block has changed, it is not necessarily the case that the block or the associated file is infected. Thus, the disk block numbers of the 'Infected' blocks 207 may then be used to identify those files whose changed blocks are 'Infected.' Any file without one or more 'Infected' blocks may be deemed as not being 'Infected.' Inasmuch as the disk block numbers of the 'Infected' blocks 207 may enable the identification of those files whose changed blocks are 'Infected,' those disk block numbers implicitly also enable the identification of those files that do not have any 'Infected' blocks.

Consistent with the foregoing, it can be seen in FIG. 2 that not all of the files included in the changed file list 108 are also included in the infected file list 210. For example, files 10 and 29 appear in the changed file list 208, but of those two, only file 29 also appears in the infected file list 210. Thus, while file 10 had one or more changed blocks, none of those blocks were infected. On the other hand, one or more of the changed blocks of file 29 were infected.

C.3

With the foregoing discussion in view, further details are provided concerning selected aspects of one or more embodiments. Such embodiments include, but are not limited to, the respective example embodiments of FIGS. 1 and 2.

C.3.1 Building a Catalog File List

Building a list of files and directories contained in an asset (catalog file list) may be performed against the source object, that is, an asset, itself during backup, or after completion of the backup operation against a pre-existing backup of that asset. For some backups, the catalog file list may already be part of the pre-existing backup and can be used directly. In other cases, the pre-existing backup may need to be scanned, as in the example of FIG. 2, and the catalog file list generated, similar to the process of building the catalog file list against the source asset during backup.

In an embodiment, building the catalog file list may involve operations including, but not limited to, reading master boot records, reading partition tables, detecting file systems, reading directory from file systems, and extracting metadata and block numbers and disk locations. Once a hierarchical catalog file list has been built, the catalog file list may be stored alongside the backup, thus enabling self-description of, and in, the backup. As noted, a catalog file list may demonstrate the association of a filename, and which disk blocks the associated file comprises.

C.3.2 Disk Extents

A disk extent is a contiguous region on a disk with a starting and ending block number. A file's content, on most file systems, is contained in one or more ordered disk extents. Thus, an embodiment may refer to "disk blocks associated with a file." In an embodiment, the 'block number' referred to herein may be stored in disk extents.

Figure 3:
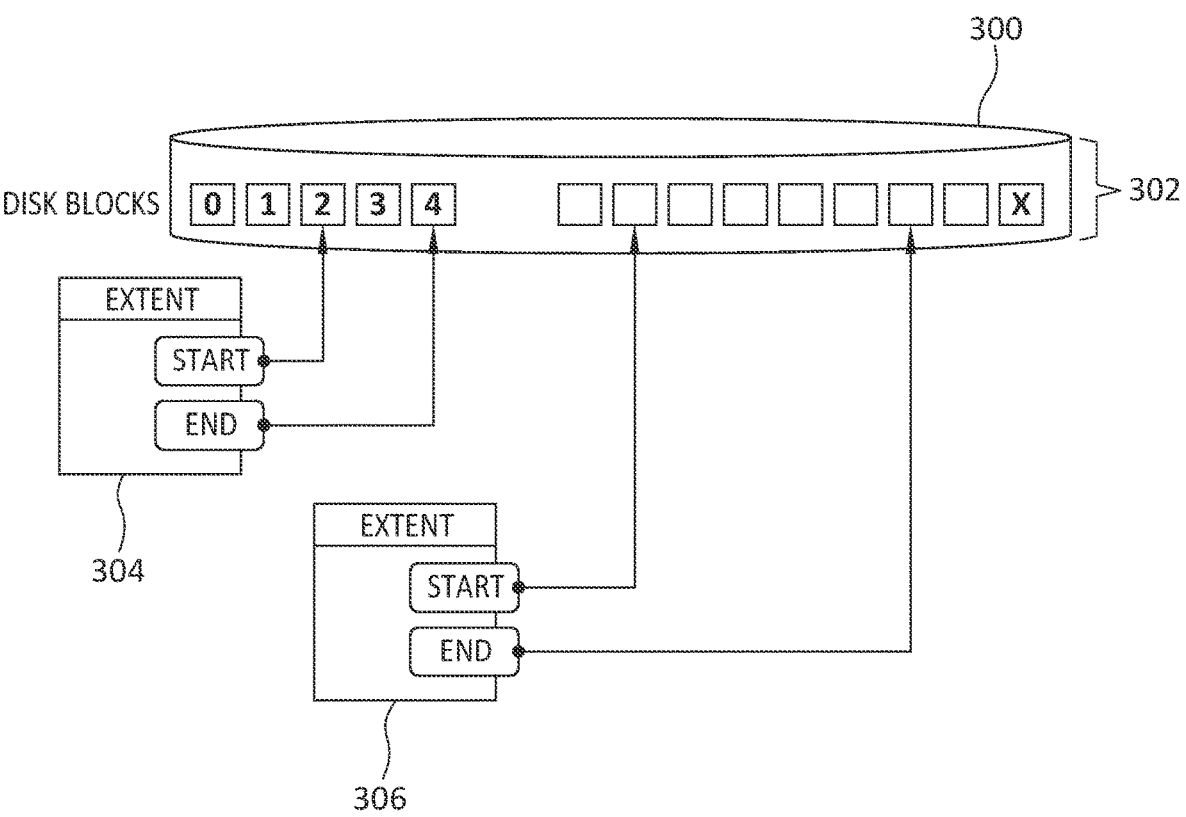
FIG. 3 discloses an example data block storage scheme, according to an embodiment.

With particular reference to the example of FIG. 3, a disk 300 is disclosed that includes a group of disk blocks 302. In FIG. 3, a first disk extent 304 is disclosed that begins with disk block '2' and ends with disk block '4.' Thus, disk extent 304 may comprise the number of the block that starts the disk extent 304, and the number of the block that ends the disk extent 304, implicitly indicating that all disk numbers from '2' to '4,' inclusive, are embraced by that disk extent 304. More generally, and as shown by the second disk extent 306, a disk extent may begin, and end, with any two blocks on the disk 300. It is noted that as used herein, 'disk' is intended to be broadly construed and includes, but is not limited to, hardware disks, and virtual disks.

C.3.3 Building a Changed File List

In an embodiment, a changed file list comprises a list of all files that have changed since the last backup of an asset. Thus, an entry in the change file list may not only include the file name, but also a list of all blocks associated with that file. The blocks may be identified by their respective block number and/or a respective disk extent to which they belong. Upon completion of the change block list, the list of change block numbers may be passed to the catalog file list to produce a list of which files have changed on this asset since the last backup.

In an embodiment, the changed file list may be built on-the-fly. For example, during change block processing, the changed block number may be sent to the catalog file list to be translated into a change file entry. If the entire change list is not available, then this becomes an option.

In an embodiment, it may be possible to skip building the change list all together and, instead, simply lookup each entry in the catalog file list. The results of this lookup operation may be a filename, and relative block position. However, building a changed file list may enable quicker lookups, as well as the ability to save this change file list alongside the destination backup.

In an embodiment, as each change block is processed, it may first be looked up in the catalog file list, which produces an entry in the changed file list. Each block that is changed is associated with a particular file and that becomes an entry in the changed file list.

In many cases, it is possible, even likely, that there will be many blocks changed in the same file. There are different techniques that may be used to address this circumstances, such as adding a "changed status" field to the catalog file list for example, and then marking each file as 'changed' as each change block number is translated, that is, the change block number is mapped to the file that includes that block, so as to indicate the file implied by that change block number. At the end of change block number translation scanning the catalog file list for all entries changed and producing the change file list from there. The other alternative is to perform a lookup against the destination change file list which may or may not be performant.

C.3.4 Building an Infected File List

In an embodiment, building the potentially infected file list may comprise processing of the change blocks. This may be performed iteratively against each change block, either during the data movement workflow in data protection, or post process against a pre-existing backup. In an embodiment, processing a change block may comprise passing the block number to the changed file list. In an embodiment, the results of this API (application program interface) call may comprise the following: (1) the filename associated with the change block; (2) the file relative block # (what block # within the file is this?); and, (3) the infected file status, thus far, of this file.

C.3.5 Infected File Status

Scanning a change block for a potentially infected files may produce several possibilities. That is, the scanned change block may exhibit various features or characteristics that may be indicative of some type of problem, such as: (1) a changed filename extension may be a well-known ransomware extension; (2) a filename may be a well-know ransomware filename, such as a request for payment; (3) an application mismatch—for example, a PDF file with invalid signature or magic # mismatch—in this case, it may be important to know the file relative block number; (4) high data entropy detected; (5) obfuscation detected—for example, the block is, or comprises, encoded and/or encrypted data; (6) and, an ML (Machine Learning) attack vector anomaly is detected. As these examples illustrate, there are differing levels of potential infection, some possibly more definitive than others. This confidence level of infection may be useful information.

C.3.6 Scanning Change Blocks for Infection

With reference to the example of FIG. 1, an embodiment of the operation (5) involves moving the changed blocks from the asset to the destination storage device. If this is a day zero backup or a full backup, then all blocks of the asset will be deemed changed and this will be a large data movement.

In an embodiment, analyzing change blocks during the data protection workflow may be advantageous since the change blocks must be moved from the asset to destination device and reside in memory during this time. On the other hand, if a pre-existing backup is being scanned, then this approach may require the change block be read from the destination backup and a considerable amount of the performance gain may be lost. Performing the analysis during backup may thus provide better performance, at least in terms of one or more of speed, efficiency, and consumption of computing resources such as processing, memory, storage, and communication bandwidth.

If a suspect block is encountered, then a call to the changed file list may be made to generate an infected file list entry. It may be the case that the block is only possibly infected, and requires further investigate to be performed post processing. Depending on the outcome of that check, there may be multiple infected states, and respective severity levels, which may be useful information in the downstream processing of the suspect block(s).

One heuristic that may be employed in an embodiment is using the infected file status during a change block analysis procedure. For example, it is possible that a change block analysis may be omitted if the changed file, that includes the block to be scanned or inspected, has already been deemed to be infected, possibly based on the outcome of an earlier scanning process performed on a different block.

D. Further Discussion

As will be apparent from this disclosure, one or more embodiments may possess various useful features and aspects. However, no embodiment is required to possess any of such features and aspects. The following examples are illustrative.

An embodiment may identify which blocks have changed between asset backups and the, in effect, translate or map those changed blocks to identify which file(s) has/have changed, and then scanning the changed block(s) for anomalies to produce a confidence level that the block has, or has not, been compromised. This information may be particularly value in the war against ransomware. An embodiment may avoid resource-intensive post-processing of blocks by including detection of problematic blocks into the data protection process itself, so as to deliver a more resilient approach to data protection. Finally, incorporating, in a backup itself, a catalog file list, a changed file list, and a potentially infected file list, may enable, or at least contribute to, self-describing of the backup, and this approach may also contribute to any downstream forensic processing operations, and products.

E. Example Methods

It is noted with respect to the disclosed methods, including the respective example methods of FIGS. 1 and 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

In an embodiment, any of the disclosed methods may be performed in whole, or in part, by a data protection application, such as a backup application for example. In an embodiment, any of the disclosed methods may be performed in whole, or in part, by a plugin, such as a plugin to a data protection application for example. No particular implementation of any of the disclosed methods is required however.

F. Further Example Embodiments

Following are some further example embodiments of the invention. These are presented only by way of example and are not intended to limit the scope of the invention in any way.

Embodiment 1. A method, comprising: performing operations including: creating, or accessing, a catalog file list that comprises a list of files and, for each of the files, a respective list of blocks of that file; identifying any of the blocks that have changed since an earlier backup of the file; updating the catalog file list to indicate any of the blocks that have changed; for any file(s) determined to have one or more changed blocks, adding those files to a changed file list; receiving information identifying blocks that are known or suspected to have been compromised; and generating an infected file list by mapping the blocks known or suspected to have been compromised to corresponding files of the changed file list.

Embodiment 2. The method as recited in any preceding embodiment, further comprising backing up the changed blocks.

Embodiment 3. The method as recited in any preceding embodiment, wherein one or more of the operations are performed while the changed blocks are being backed up.

Embodiment 4. The method as recited in any preceding embodiment, wherein the operations are performed after the changed blocks have been backed up.

Embodiment 5. The method as recited in any preceding embodiment, wherein the catalog file list is associated with a specific asset.

Embodiment 6. The method as recited in any preceding embodiment, wherein the catalog file list is associated with a specific backup dataset.

Embodiment 7. The method as recited in any preceding embodiment, wherein the information identifying blocks that are known or suspected to have been compromised is received from an interrogation performed by a backup application while the changed blocks are being backed up.

Embodiment 8. The method as recited in any preceding embodiment, wherein the information identifying blocks that are known or suspected to have been compromised is received from scanning process performed after the changed blocks have been backed up.

Embodiment 9. The method as recited in any preceding embodiment, wherein the information identifying blocks that are known or suspected to have been compromised comprises a list of block numbers, each identifying a respective infected block.

Embodiment 10. The method as recited in any preceding embodiment, wherein the infected file list is stored together with a backup of the changed blocks.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
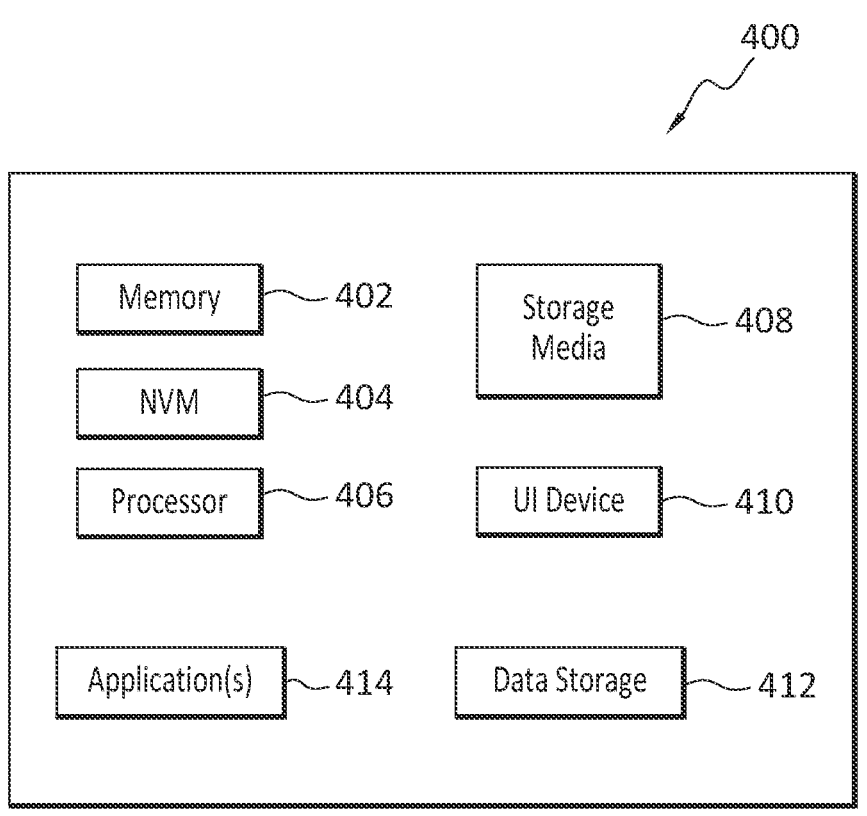
FIG. 4 discloses an example computing entity configured and operable to perform any of the disclosed, methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing operations including:
   creating, or accessing, a catalog file list that comprises a list of files and, for each of the files, a respective list of blocks of that file;
   identifying any of the blocks that have changed since an earlier backup of the file;
   updating the catalog file list to indicate any of the blocks that have changed;
   for any file(s) determined to have one or more changed blocks, adding those files to a changed file list;
   receiving information identifying blocks that are known or suspected to have been compromised; and
   generating an infected file list by mapping the blocks known or suspected to have been compromised to corresponding files of the changed file list.

2. The method as recited in claim 1, further comprising backing up the changed blocks.

3. The method as recited in claim 1, wherein one or more of the operations are performed while the changed blocks are being backed up.

4. The method as recited in claim 1, wherein the operations are performed after the changed blocks have been backed up.

5. The method as recited in claim 1, wherein the catalog file list is associated with a specific asset.

6. The method as recited in claim 1, wherein the catalog file list is associated with a specific backup dataset.

7. The method as recited in claim 1, wherein the information identifying blocks that are known or suspected to have been compromised is received from an interrogation performed by a backup application while the changed blocks are being backed up.

8. The method as recited in claim 1, wherein the information identifying blocks that are known or suspected to have been compromised is received from scanning process performed after the changed blocks have been backed up.

9. The method as recited in claim 1, wherein the information identifying blocks that are known or suspected to have been compromised comprises a list of block numbers, each identifying a respective infected block.

10. The method as recited in claim 1, wherein the infected file list is stored together with a backup of the changed blocks.

11. A non-transitory storage medium having stored therein instructions that are executable by one or more hardware processors to perform operations comprising:
   creating, or accessing, a catalog file list that comprises a list of files and, for each of the files, a respective list of blocks of that file;
   identifying any of the blocks that have changed since an earlier backup of the file;
   updating the catalog file list to indicate any of the blocks that have changed;
   for any file(s) determined to have one or more changed blocks, adding those files to a changed file list;
   receiving information identifying blocks that are known or suspected to have been compromised; and generating an infected file list by mapping the blocks known or suspected to have been compromised to corresponding files of the changed file list.

12. The non-transitory storage medium as recited in claim 11, further comprising backing up the changed blocks.

13. The non-transitory storage medium as recited in claim 11, wherein one or more of the operations are performed while the changed blocks are being backed up.

14. The non-transitory storage medium as recited in claim 11, wherein the operations are performed after the changed blocks have been backed up.

15. The non-transitory storage medium as recited in claim 11, wherein the catalog file list is associated with a specific asset.

16. The non-transitory storage medium as recited in claim 11, wherein the catalog file list is associated with a specific backup dataset.

17. The non-transitory storage medium as recited in claim 11, wherein the information identifying blocks that are known or suspected to have been compromised is received from an interrogation performed by a backup application while the changed blocks are being backed up.

18. The non-transitory storage medium as recited in claim 11, wherein the information identifying blocks that are known or suspected to have been compromised is received from scanning process performed after the changed blocks have been backed up.

19. The non-transitory storage medium as recited in claim 11, wherein the information identifying blocks that are known or suspected to have been compromised comprises a list of block numbers, each identifying a respective infected block.

20. The non-transitory storage medium as recited in claim 11, wherein the infected file list is stored together with a backup of the changed blocks.

\* \* \* \* \*